No. 634,842. Patented Oct. 10, 1899.
H. BEECH.
APPARATUS FOR AUTOMATICALLY CAUSING FLOW OF WATER, &c.
(Application filed Dec. 13, 1898.)
(No Model.) 2 Sheets—Sheet 1.
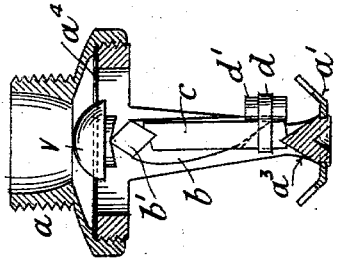
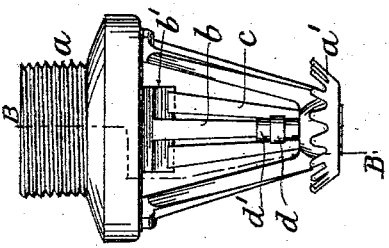
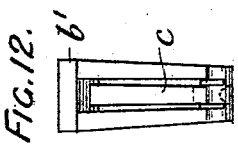
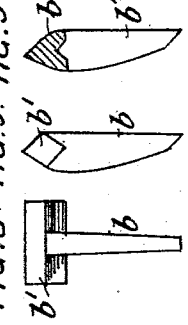
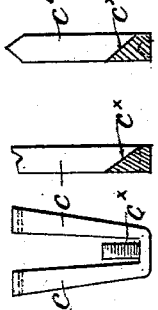
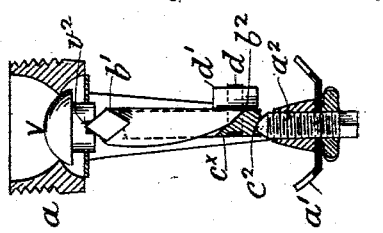
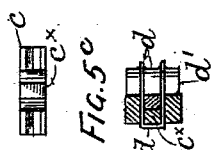
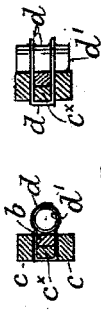
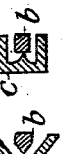
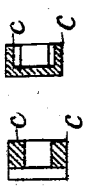
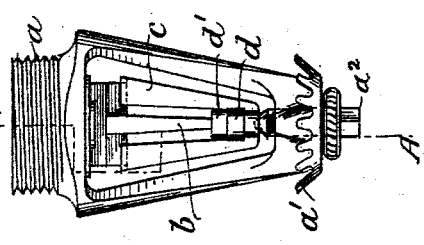
WITNESSES:
P. W. Wright
S. C. Connor
INVENTOR
HANDEL BEECH
BY
Howson and Howson
HIS ATTORNEYS.

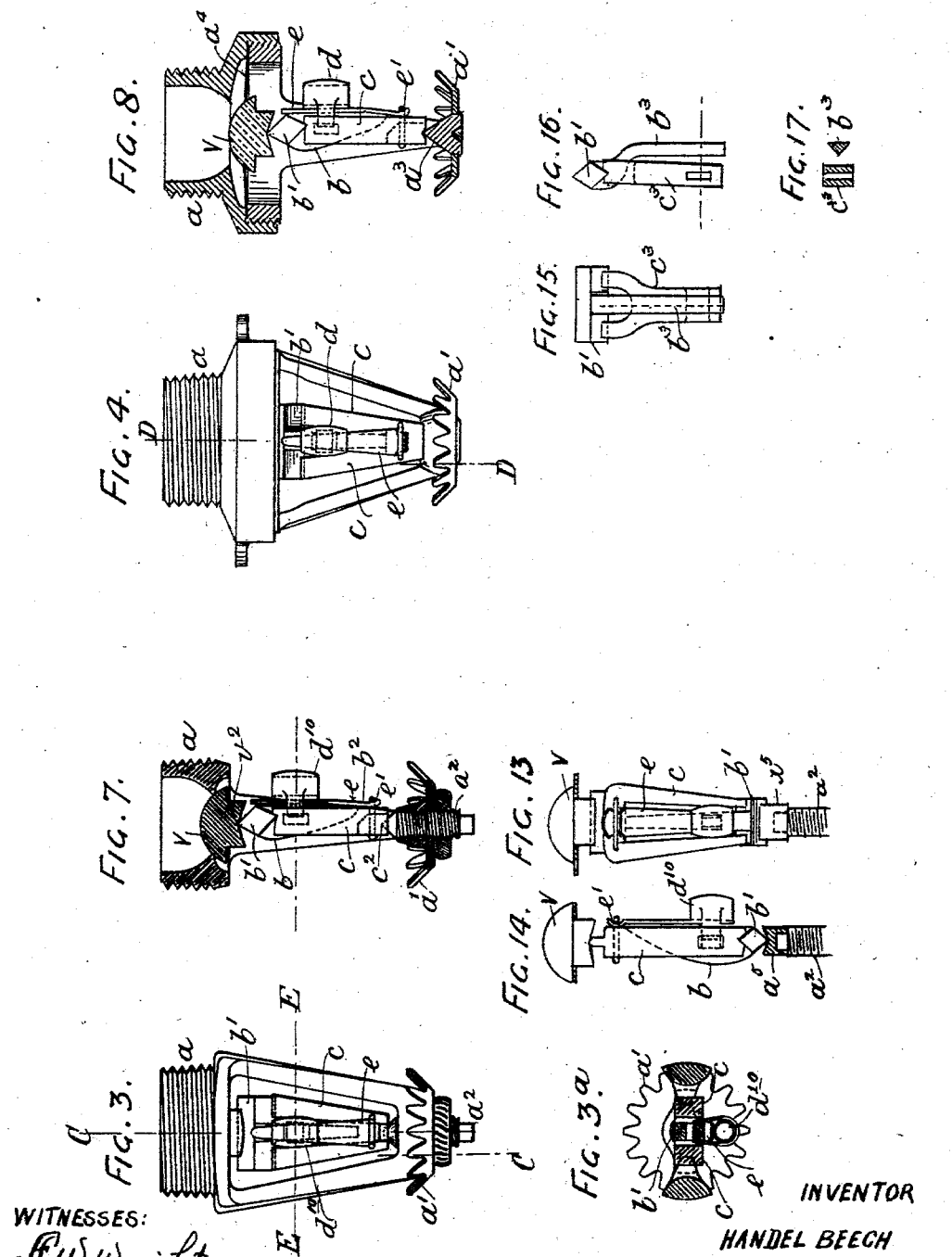

UNITED STATES PATENT OFFICE.

HANDEL BEECH, OF OLDHAM, ENGLAND.

APPARATUS FOR AUTOMATICALLY CAUSING FLOW OF WATER, &c.

SPECIFICATION forming part of Letters Patent No. 634,842, dated October 10, 1899.

Application filed December 13, 1898. Serial No. 699,145. (No model.)

*To all whom it may concern:*

Be it known that I, HANDEL BEECH, a subject of the Queen of Great Britain, residing at Oldham, near Manchester, in the county of Lancaster, England, have invented new and useful improvements in apparatus for automatically causing a flow of water or other fluid by the fusion of a suitable joint or connection for fire-extinguishing and like purposes, of which the following is a specification.

This invention relates to that class of apparatus for which Letters Patent No. 20,725 were granted to me in Great Britain, dated the 9th day of September, 1897, the object being to simplify and cheapen the construction of such apparatus and to improve the same by allowing little or no surface of the separate parts to remain in contact when the apparatus is set ready for action, as such contact may cause adhesion in the presence of corrosive gases or moisture and thus retard or even prevent the separation of the parts when released by the melting of the fusible holdfast or joint.

The invention consists in the use of two principal separable parts, the one, hereinafter called a "lever," supporting the valve against its seating by a knife-edge and notch, as described in the specification of the aforesaid Letters Patent or otherwise, and the other, hereinafter called a "prop," supporting that first-named by a knife-edge which may be on either part, or the props may support the valve and be supported by the lever on a knife-edge, as hereinafter described. These two parts are secured together, preferably at or near their lower ends, by a fusible grip or joint similar to that described by the aforesaid specification, and the knife-edges are so placed with regard to each other that the lower end of the lever will always be forced outward and away from the supporting part or prop by the force of the water acting on the valve when the holdfast or joint is destroyed. The prop may be supported by an adjustable support or a fixed one, according to the form of valve used, as described in the aforesaid specification.

Figures 1, 2, 3, and 4 on the annexed drawings are front elevations showing my invention applied in various ways. Figs. 5, 6, 7, and 8 are vertical sections taken through the lines A A, B B, C C, and D D on the above figures. Fig. 3ª is a horizontal section through the line E E on Fig. 3. Figs. 8ª and 9 are front and side views of the lever shown on Figs. 1 and 5. Figs. 10 and 11 are similar views of the prop. Fig. 10ª is a plan of Fig. 10. Figs. 9ª and 11ª illustrate another form of lever and prop hereinafter referred to. Figs. 5ª and 6ª are transverse sections through the lever and prop, seen at Figs. 5 and 6, respectively. Fig. 5ᵇ is a detached plan view of the holdfast thereof. Fig. 5ᶜ shows a transverse holdfast connecting the lever and prop. Fig. 12 is a front view of a modified form of lever and prop. Fig. 13 is a front view showing the prop supported by the lever and supporting the valve. Fig. 14 is a side view of this arrangement. Figs. 6ᶜ, 6ᵈ, 6ᵉ, 6ᶠ, and 6ᵍ are horizontal sections showing various forms of prop having no point of contact with the lever other than knife-edges or rounded edges. Figs. 15, 16, and 17 show in side elevation and front view and horizontal section another form of lever and prop.

On all the figures, $a$ is the valve-casing and support for the parts. $a'$ is the water-spreader at the bottom thereof. The support for the bottom of the prop is shown as a screw $a^2$ at Figs. 5 and 7 or a fixed edge $a^3$ at Figs. 6 and 8, these latter figures showing the valve-seating $a^4$ in the form of a flexible diaphragm forced down on the valve $v$ by the pressure of water.

$b$ is the lever, $c$ the prop, and $d$ the holdfast-arms, soldered by readily-fusible solder to the tube $d'$, and thus normally keeping the parts $b$ and $c$ together.

In order to reduce to a minimum the surface contact of the parts when set together ready for action, I propose in some cases to form the lever somewhat T-shaped (see Figs. 8ª and 9) with a downwardly-depending limb $b$ and an upper cross-piece $b'$, the latter being formed with a knife-edge at the top to support the valve $v$ and a similar edge at the lower part engaging with a broad angular notch in the upper part of the prop $c$, or, vice versa, the notch may be in the lower surface of the T-shaped part of the lever $b^{10}$ and a knife-edge on the prop $c^{10}$. (See Figs. 9ª and 11ª.)

The prop $c$ may be made somewhat in the form of a U (see detached views, Figs. 10 and 11)—that is, it may have a deep vertical cut or slot commencing at the top and reaching nearly to the bottom, and this cut or slot is long and wide enough to allow the depending limb $a'$ of the lever to pass freely through or into the same without touch at the sides.

The holdfast consists of arms $d$ so connected to the prop (see Figs. $5^a$ and $6^a$) that their free ends can pass through the slot or cut in the prop $c$ on either side of the lower limb $b$ of the lever and grip a vertical or transverse tube or bar $d'$, to which they are soldered; but they cannot escape altogether through the said prop $c$, as they are looped about the projection $c^\times$ of the prop.

The prop may be formed with a strengthening-plate at the back, (see Fig. $6^c$,) or it may be U-shaped (see Fig. $6^d$) or angular in horizontal section, (see Fig. $6^e$,) or it may present a knife-edge (see Fig. $6^f$) along the said lever $b$, or it may be made, say, semicircular in horizontal section. (See Fig. $6^g$.)

In some cases in addition to the parts $b$ and $c$ I employ a flat strap $e$, (see Figs. 3, $3^a$, 4, 7, and 8,) hooked at $e'$ to the prop $c$ and held by the holdfast $d^{10}$, which in this case is connected to the lever $b$, as shown. The end of the lever is forced against the strip $e$ near its hook or fulcrum $e'$; but the holdfast $d^{10}$ normally prevents the end of the strip $e$ from being forced out beyond a certain angle by the lever until the solder is melted.

In some cases the lever $b$ may be made in an inverted form with a cross-bar $b^\times$ supporting the valve, (see Fig. 12,) and the strut or prop $c$ works between the depending arms thereof and is notched at the top, so as to carry the knife-edge of the cross-bar $b^\times$, or the prop $c$ may be inverted and support the valve $v$, being supported on the inverted-T-shaped lever $b\ b'$, as seen at Figs. 13 and 14. In this case when an adjustable supporting-screw $a^2$ is used the lower knife-edge of the cross-bar $b'$ is carried by a head or shoe $a^5$, in the shank of which the end of the screw $a^2$ can revolve for adjustment.

It will be seen on reference to Figs. $6^c$, $6^d$, $6^e$, $6^f$, and $6^g$ that the form of recess in the prop $c$ is such that the free end $b$ of the lever cannot be forced accidentally back in the wrong direction, and on reference to Figs. 5, $5^a$, 6, $6^a$, 7, $3^a$ and 8 it will be seen that the inclined projection $c^\times$ at the bottom of the U-shaped prop will serve this purpose also, as well as forming a point of attachment or resistance for the holdfast $d$ to resist the outward motion of the said free end $b$ of the lever. Thus the knife-edges cannot be so set that the pressure of the water will not tend to force the said end of the lever outward. In other words, the point or edge $b^2$, which is the fulcrum of the lever, must be outside the line of pressure between the points or edges $v^2$ and $c^2$.

In some cases (see Figs. 15 and 16) the lever $b^3$ may be simply cranked at the top to carry the cross-piece $b'$ to support the valve $v$ and be supported by the prop $c^3$, which in this case is only recessed sufficiently for the insertion of the cranked upper end of the lever $l$.

The holdfast may be applied either as seen at Figs. 5 and 6 or as seen at Figs. 7 and 8.

I claim as my invention—

1. An automatic fire-sprinkler having a valve, a lever having two knife-edges, one supporting the valve, and a prop supporting the other, said lever having an arm extending between the sides of the prop but free from contact with the prop on all the sides thereof, said parts in their normal position holding the valve closed, and both prop and lever adapted to be moved away from their normal position in the same direction by pressure on the valve, and a fusible holdfast between the prop and lever, substantially as described.

2. An automatic fire-sprinkler having a valve, a T-shaped lever having knife-edges at its upper part to sustain the valve, a U-shaped prop adapted to support the lever at its upper end, said lever having its lower end suspended in the looped portion of the U-shaped prop, but free from contact with the sides of the prop and a fusible holdfast between the prop and lever, substantially as described.

3. An automatic fire-sprinkler having a valve, a lever having two knife-edges, one supporting the valve, and a prop supporting the other, said lever having an extending arm free from contact with the prop on all the sides thereof, and adapted to be moved away from the prop by pressure on the valve, in combination with a locking-piece $e$ adapted to limit the extent of the lever's movement and a fusible holdfast to release the locking-piece and lever, substantially as described.

4. An automatic fire-sprinkler having a lever and a U-shaped prop, said lever-arm adapted to hang between and free from contact with the arms of the props and a stop $c^\times$ on the prop to limit the backward motion of the lever, substantially as described.

In testimony whereof I have signed my name to this specification in the presence of two subscribing witnesses.

HANDEL BEECH.

Witnesses:
　JNO. HUGHES,
　J. ERNEST HUGHES.